No. 888,022. PATENTED MAY 19, 1908.
H. J. LAWRENCE.
TREE TRIMMER.
APPLICATION FILED JULY 11, 1907.
2 SHEETS—SHEET 1.
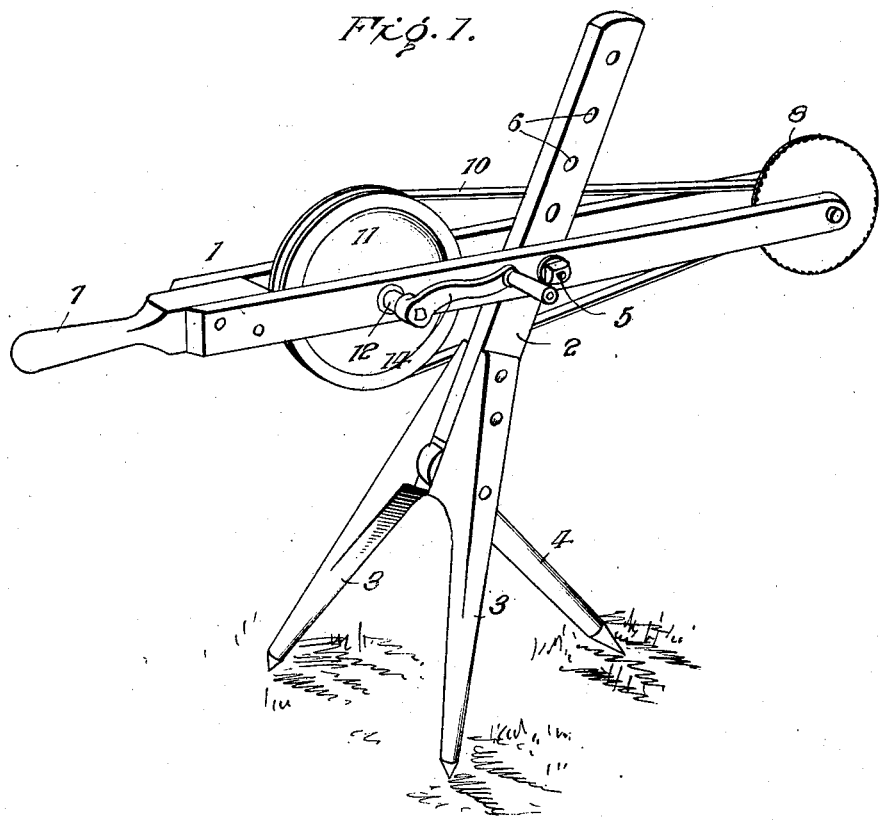
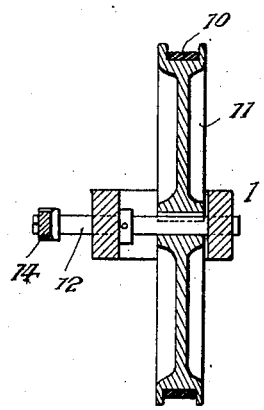
Inventor
Henry J. Lawrence, No. 888,022. PATENTED MAY 19, 1908.
H. J. LAWRENCE.
TREE TRIMMER.
APPLICATION FILED JULY 11, 1907.
2 SHEETS—SHEET 2.
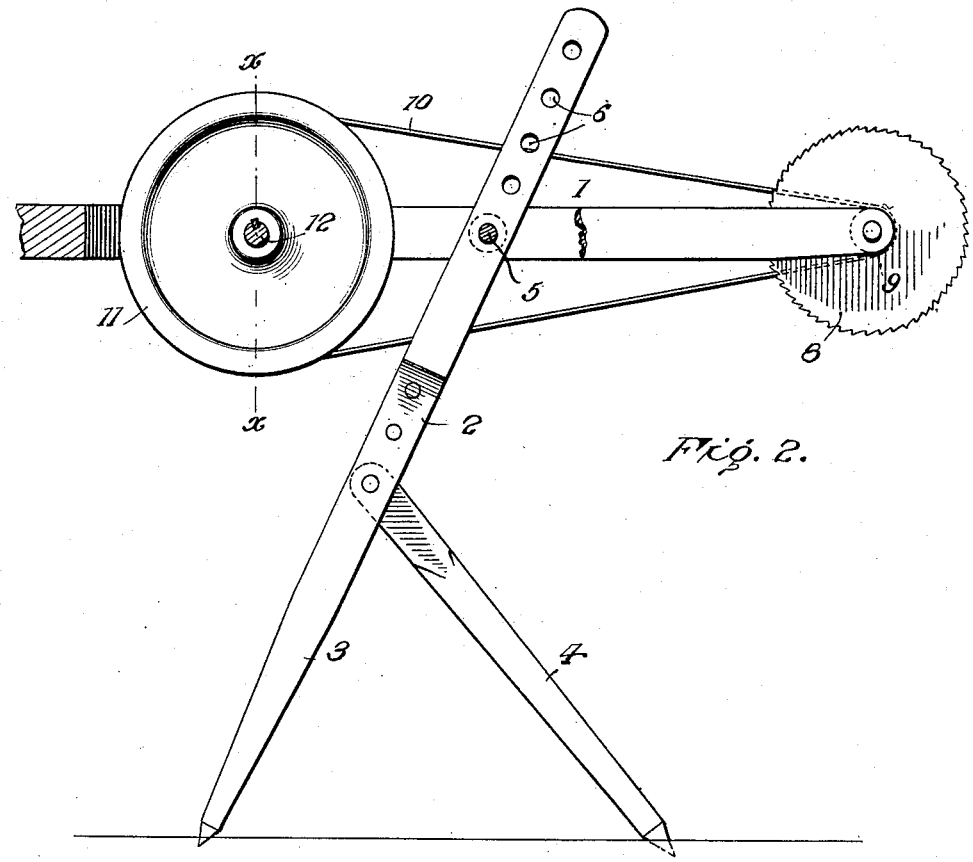
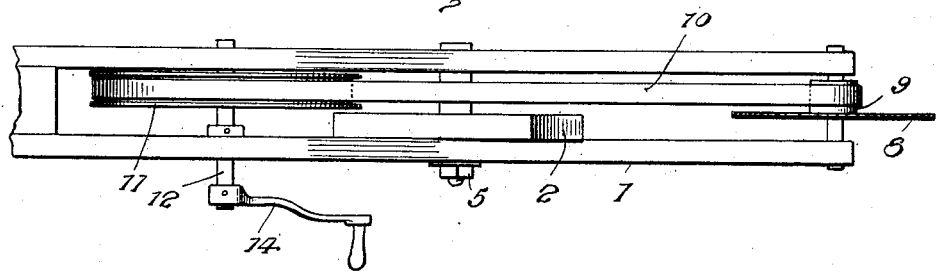
Inventor
Henry J. Lawrence,

UNITED STATES PATENT OFFICE.

HENRY J. LAWRENCE, OF LONGBEACH, CALIFORNIA.

TREE-TRIMMER.

No. 888,022.　　　Specification of Letters Patent.　　　Patented May 19, 1908.

Application filed July 11, 1907. Serial No. 383,353.

*To all whom it may concern:*

Be it known that I, HENRY J. LAWRENCE, citizen of the United States, residing at Longbeach, in the county of Los Angeles and State of California, have invented certain new and useful Improvements in Tree-Trimmers, of which the following is a specification.

The present invention relates to improvements in tree trimmers of that type comprising a portable frame having a saw or like cutting member mounted thereon, means being provided for operating the saw.

The object of the invention is to design a trimming device of this character which can be readily applied to any desired limb of a tree and which operates in an effective manner to sever the same.

For a full understanding of the invention and the merits thereof and also to acquire a knowledge of the details of construction and of the means for effecting the result, reference is to be had to the following description and accompanying drawings, in which:

Figure 1 is a perspective view of a tree trimmer embodying the invention; Fig. 2 is a side elevation of the same, parts being removed. Fig. 3 is a top plan view of the tree trimmer parts being broken away; and, Fig. 4 is a sectional view on the line x—x of Fig. 2.

Corresponding and like parts are referred to in the following description and indicated in all the views of the drawings by the same reference characters.

The cutting or trimming mechanism proper is carried by a frame 1 adjustably mounted upon a portable standard comprising an upright bar 2 provided at its lower end with the spaced and diverging legs 3. A prop 4 is pivoted between the upper portion of the legs 3 and coöperates with the latter to hold the standard in an upright position. The frame 1 comprises spaced side pieces fitting against opposite sides of the upright bar 2 and pivotally connected to the same by a bolt 5 passing through a selected one of a series of openings 6 in the upright 2. One end of the frame 1 is provided with a handle 7 while a disk saw 8 is journaled between the spaced side pieces at the opposite end of the frame. A pulley 9 is rigid with the disk saw 8 and receives a belt 10 engaging a drive wheel or pulley 11 journaled between the side pieces of the frame adjacent the handle 7. This drive wheel 11 is keyed upon, or otherwise made rigid with the shaft 12, one end of which is provided with a crank handle 14. It will thus be apparent that by manipulating the handle 7, the frame 1 can be swung about the pivot bolt 5 and the saw 8 brought into contact with the desired limb, whereupon the said saw can be set in motion by turning the crank handle 13 and the limb severed from the tree. By passing the pivot bolt or pin 5 through any one of the series of openings 6 in the upright bar 2, the elevation of the frame 1 can be adjusted to enable the device to operate under various conditions.

Having thus described the invention, what is claimed as new is:

1. In a tree trimmer, the combination of a standard having a plurality of openings therein, a frame comprising spaced side pieces pivotally connected to the standard at an intermediate point by a pin passing through a selected one of the said openings, a disk saw journaled between the side pieces of the frame, and a saw operating mechanism mounted upon the frame.

2. In a tree trimmer, the combination of an upright bar, spaced diverging legs at the lower end of the upright bar, a prop pivoted between the legs and coöperating therewith to hold the bar in an upright position, a frame comprising spaced side pieces receiving the upright bar between the same, the said frame being pivotally mounted at an intermediate point upon the bar, a disk-saw journaled between the side pieces of the frame at one end thereof, a pulley applied to the disk saw, a handle projecting longitudinally from the opposite end of the frame, a drive wheel journaled between the side pieces of the frame at the said opposite end thereof, and a belt for transmitting motion from the drive wheel to the pulley.

In testimony whereof I affix my signature in presence of two witnesses.

HENRY J. LAWRENCE. [L. S.]

Witnesses:
　JOHN H. BROWN,
　EDWARD A. LAWRENCE.